United States Patent [19]

Cummings, III

[11] Patent Number: 4,899,861
[45] Date of Patent: Feb. 13, 1990

[54] VARIABLE SPEED DRIVE FOR ENGINE COOLING FANS

[75] Inventor: Gordon F. Cummings, III, Rockford, Ill.

[73] Assignee: Rockford Powertrain, Inc., Rockford, Ill.

[21] Appl. No.: 26,504

[22] Filed: Mar. 16, 1987

[51] Int. Cl.[4] .................. F16D 25/061; F16D 13/74; F16H 57/00

[52] U.S. Cl. .............. 192/85 AA; 192/70.12; 192/110 B; 192/113 B; 474/92

[58] Field of Search ......... 192/85 AA, 85 CA, 110 B, 192/113 B, 82 T, 91 R, 115, 70.12, 109 F; 474/92

[56] References Cited

U.S. PATENT DOCUMENTS

| | | | |
|---|---|---|---|
| 2,927,563 | 3/1960 | Geiger | 192/85 AA X |
| 3,581,858 | 6/1971 | Haley | 192/106 F |
| 3,804,219 | 4/1974 | Cummings, III | 192/82 T |
| 4,094,393 | 6/1978 | Spokas | 192/82 T |
| 4,132,301 | 1/1979 | Zabonick | 192/85 AA |
| 4,231,457 | 11/1980 | Cornish | 192/82 T |
| 4,589,535 | 5/1986 | Hall et al. | 192/70.12 |

FOREIGN PATENT DOCUMENTS 167947 12/1981 Japan ................... 474/92

OTHER PUBLICATIONS

Borg-Warner blue line drawing D54X255A, "Fan Clutch Assembly", circa 1976.
Borg-Warner blue line drawing 4-292-249-23595, "Fan Drive Assembly," circa 1977.
Borg-Warner blue line drawing 4-154-292-050150, "Fan Clutch Assembly," circa 1978.
Borg-Warner blue line drawing A4-292-249-31941, "Fan Drive Assembly," Sep. 6, 1982.
Borg-Warner blue line drawing A4-154-292-28859, "Fan Clutch Assy. 5.25" (12) Plate, Dec. 6, 1983.

Primary Examiner—Leslie A. Braun
Assistant Examiner—Richard M. Lorence
Attorney, Agent, or Firm—Leydig, Voit & Mayer, Ltd.

[57] ABSTRACT

A variable speed fan drive including a cantilevered support and axially spaced bearings for mounting an input drive member with a cylinder portion and an output fan hub assembly for rotational movement relative to each other and to the support. A modulatable wet type clutch assembly is operably effective to couple the input drive member to the fan hub assembly. The output speed of the fan hub is regulated by the axial compressive force a clutch engaging member applies against interleaved members of the clutch assembly. The clutch engaging member cooperates with the cylinder portion of the input drive member to define an expansible chamber so designed that all clutch clamping forces are confined within the drive member. As such, substantially no axial thrust load is exerted on the axially spaced bearings during clutch application. The drive unit may further include cooperative elements arranged on the drive member and the fan hub assembly for preventing belt cord debris from becoming entangled thereabout.

3 Claims, 2 Drawing Sheets

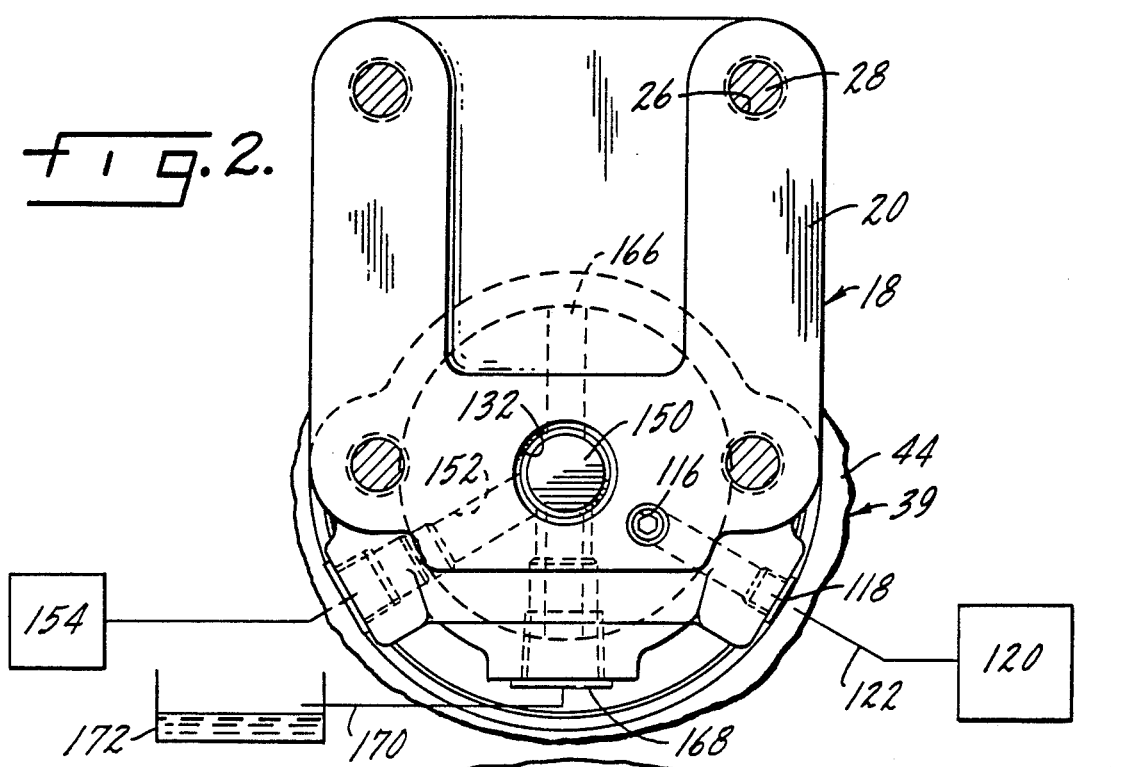
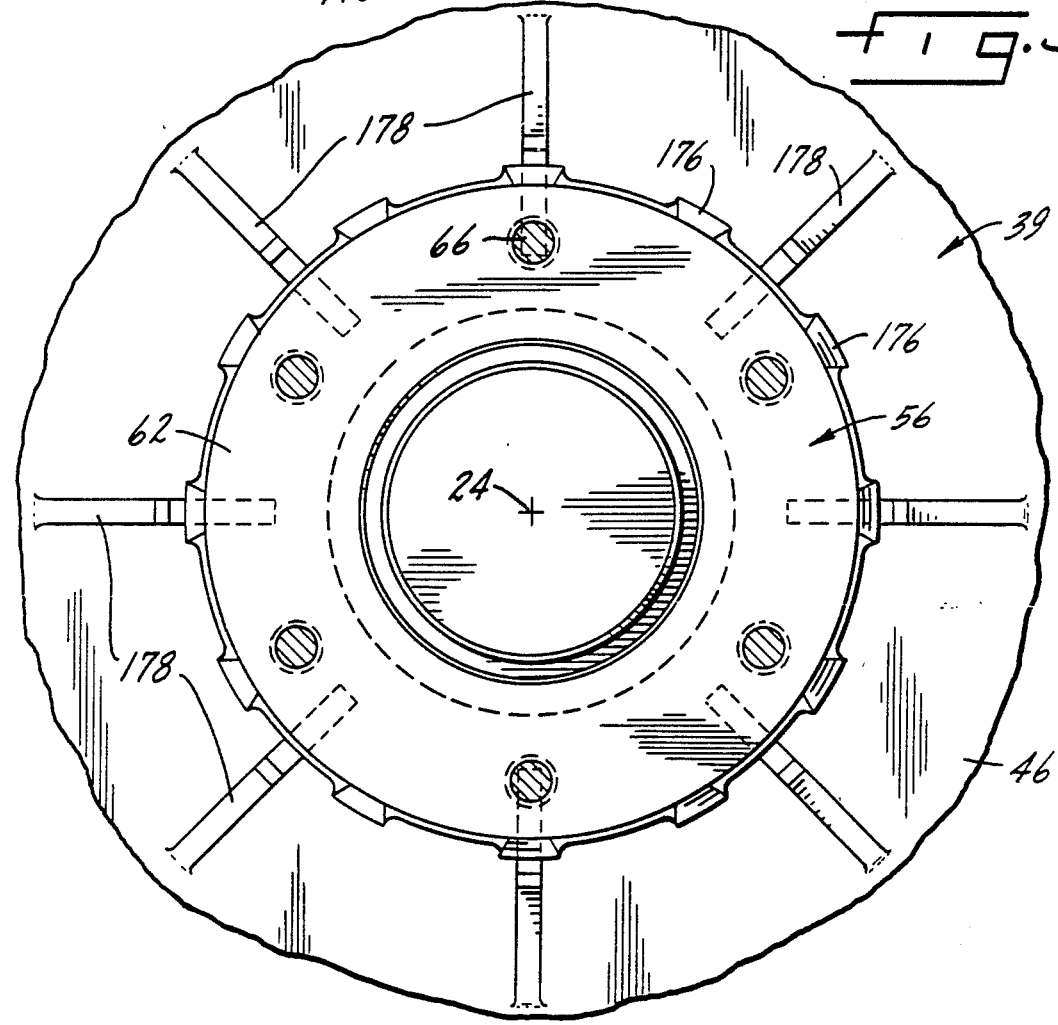

VARIABLE SPEED DRIVE FOR ENGINE COOLING FANS

FIELD OF THE INVENTION

The present invention generally relates to clutch mechanisms and, more particularly, to a variable speed fan drive assembly including a variable torque, slip-drive friction clutch assembly.

BACKGROUND OF THE INVENTION

In many applications, and partiCularly in the case of internal combustion engines for vehicles, cooling requirements are subject to wide variations depending upon operating conditions. When the engine is cold or cool, little or no cooling is required until the engine reaches a predetermined temperature. During engine operation, the degree of cooling required varies as a function of engine load and with external conditions such as air temperature and wind velocity. A cooling fan absorbs a considerable proportion of the total output power of an engine. From an engine design viewpoint, therefore, it is preferable to operate the cooling fan only when required or at a reduced level.

Various fan drives have been proposed to answer Industry needs. The basic Industry requirements being that the fan drive must be a modular unit which lasts substantially for the life of the engine and is easily serviceable. Early fan drive designs included sealed bearings and dry clutches. The contamination problems inherit with dry clutches are well known. Moreover, and because of their limited lubricant, sealed bearings would not and could not last the life of the engine. One problem with dry clutches is that they could not slip for long without overheating. Accordingly, they were limited to "on"/"off" applications. Furthermore, there was usually a shock load incurred in the drive unit when the dry clutch was engaged thus affecting the life expectancy of the clutch, attached belts, fans and idlers.

Having an appreciation for the drawbacks inherent with dry clutch fan drives, another attempted solution involved the use of a viscous coupling between the input and output members of the drive unit. It too had inherent drawbacks. First, viscous couplings have poor release capability and no lock-up capability. That is, a viscous coupling will not permit the drive input and output members to be driven at the same speed. Moreover, fan drives using viscous couplings were observed to have low horsepower capability and could not quickly dissipate heat build up in the unit. Most viscous coupling designs are slow to engage after sensing heat. Therefore, fan drives utilizing viscous couplings must initiate engagement at a lower temperature than desirable.

From these earlier designs, the invention disclosed in U.S. Pat. No. 3,804,219 evolved. This patented design uses shimmed bearings which are lubricated through a force feed system and a wet clutch assembly. This design outlasted the dry clutch systems, released and locked-up better than those drives using a viscous coupling and, by test, better stabilized the coolant temperature than any other fan drive. The '219 patented design, however, was not without drawbacks. This unique design employed fluids and gases for operation. Contaminants from both external and internal sources, however, made it difficult to keep the fluids and gases in the areas where they belonged. Moreover, all of the thrust load used in applying the clutch was also applied to the bearings of the drive assembly. As a result, bearing life was reduced. The bearings had to be shimmed to proper running clearance. The problems inherent with shimming bearings are well known. Moreover, the shaft supporting the drive unit was weakened because of the lubrication passages required for the bearings. Furthermore, the '219 invention utilized a spring applied clutch, the effectiveness of which was reduced by fluid pressure introduced into a controlled chamber. In addition to shimming the bearings, the spring had to be shimmed to proper position for stroke. This spring applied feature seldom, if ever, provided additional service time after a component failure. Moreover, the additional loading required to keep the spring compressed 95% of the time actually reduced the life of some other drive components. Furthermore, contaminants and cords from fraying belts continued to cause leakage by damaging the external seals. For these and other reasons, and as evidenced by the state-of-the-art, Industry continues to search for better fan drives.

SUMMARY OF THE INVENTION

In view of the above, and in accordance with the present invention, there is provided a fan drive assembly which satisfies Industry requirements while avoiding the drawbacks associated with earlier designs. The drive assembly of the present invention is designed as a modular unit which includes a driven input member having a series of chambers including a piston chamber and an output member or fan hub assembly. The input and output members are coaxially mounted on a cantilevered support. Axially spaced bearing means mount the first and second members for rotational movement relative to each other and about the support member. A wet clutch assembly or pack including a series of interleaved elements is operably effective to couple together said first and second members. Unlike the '219 design, the present invention includes a pressure responsive actuator member which is mounted in the piston chamber for applying pressure to the clutch pack. In contrast to the '219 design, a resilient member is utilized to disengage the clutch assembly. By such construction, the operable effectiveness of the clutch may be modulated as a function of the pressure applied to the clutch pack whereby allowing the output member or fan hub to be driven at an infinitely variable ratio relative to the input member. Moreover, the pressure responsive piston is arranged in the piston chamber such that all clamping forces are confined to the input member. As such, substantially no axial thrust load is exerted on the axially spaced bearing means supporting the members for rotation. Fluid passageways are provided in the cantilevered arm for supplying fluid pressure to the pressure regulated piston and for lubricating the clutch and bearing means. Such passageways include a rotary joint between the support member and the drive member. The rotary joint eliminates the need for bearings usually required to isolate parts with relative rotation. Means for automatically withdrawing fluid from the unit as the input drive member rotates is also provided. Moreover, the present invention includes cooperatively arranged means on the input drive member and the output member for preventing belt cord debris from becoming entangled thereabout.

Accordingly, a primary object of this invention is the provision of a variable speed drive having a modulatable clutch assembly subject to actuation by a piston which exerts substantially no axial thrust load on the bearings of the drive unit when the clutch is applied.

Another object of this invention is the provision of a drive unit including rotatably related first and second members which are maintained for rotation about axially spaced bearings, a clutch assembly for operably coupling said first and second members, and a clutch actuator which engages said clutch without substantially exerting any thrust load on the bearings.

An additional object of this invention is to provide a variable speed fan drive incorporating a wet clutch assembly for coupling a rotatably supported input drive member to a rotatably mounted fan hub, wherein the fan hub may be driven at different speeds with respect to the input drive member by controlling the pressure applied to the clutch assembly in accordance with temperature changes and cooling requirements.

Another object of this invention is to provide an improved hydraulically applied clutch assembly which employs a minimum of parts and is constructed with the utmost simplicity yet is capable of carrying a relative high torque load.

BRIEF DESCRIPTION OF THE DRAWINGS

Having in mind the above objects and other attendant advantages that would be evident from an understanding of this disclosure, the invention comprises the devices, combination and arrangment of parts as illustrated in the presently preferred form of the invention which is hereinafter set forth in detail to enable those skilled in the art to readily understand the function, operation, construction and advantages of same when read in conjunction with the accompanying drawings in which:

FIG. 2 is a partial end view of the present invention as seen along line 2—2 of FIG. 1; and FIG. 3 is an end view of the present invention as seen along line 3—3 of FIG. 1.

DETAILED DESCRIPTION OF A PREFERRED EMBODIMENT

Figure 1:
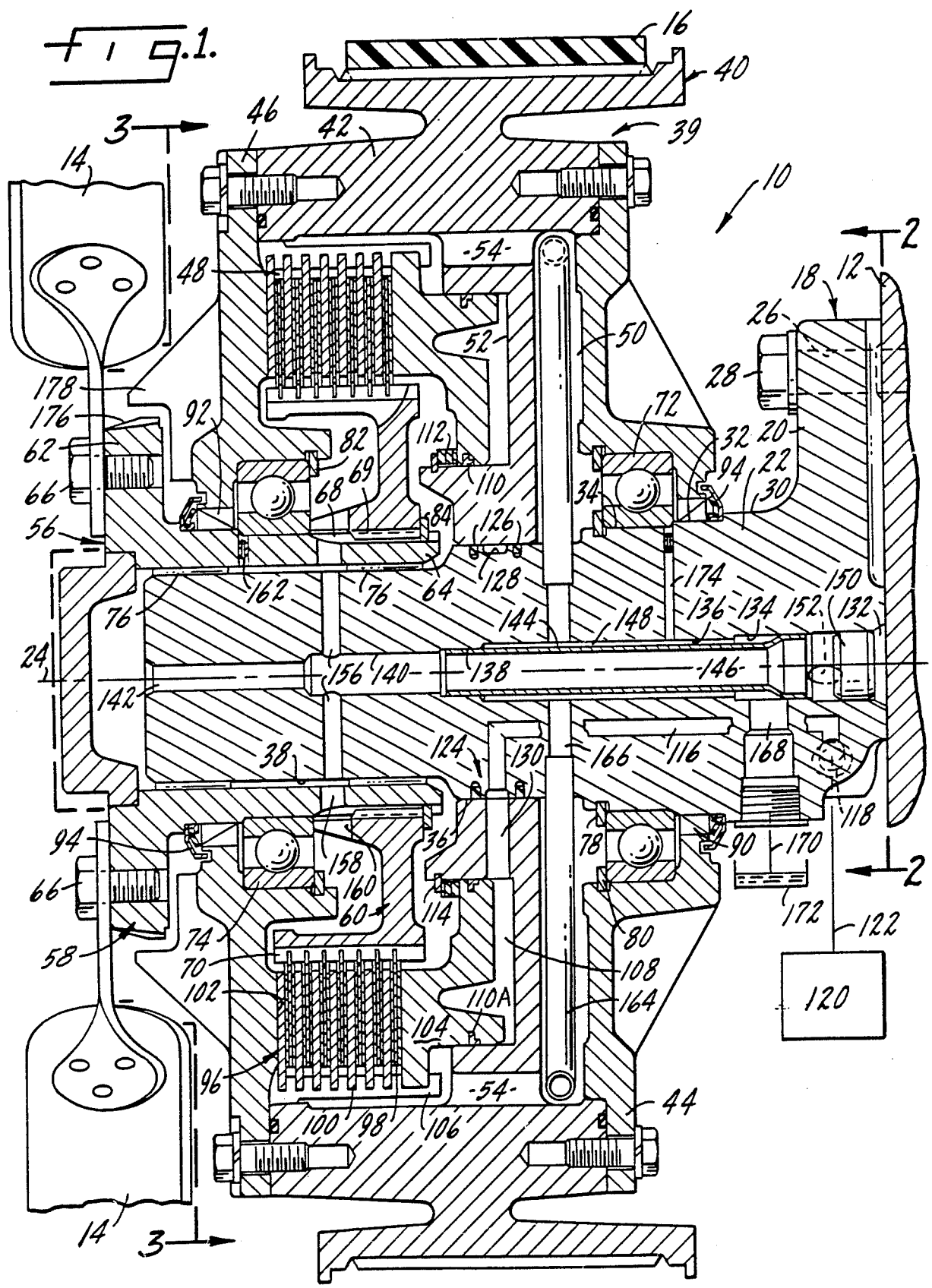
FIG. 1 is a sectional view of the variable speed drive assembly of the present invention.

Referring now to the drawings, wherein like reference numerals indicate like parts throughout the several views, in FIG. 1 the invention is shown as a variable speed fan drive 10 mounted on a prime mover or internal combustion engine 12. Fan blades 14 are connected to the drive for circulating a current of air about portions of an engine cooling system (not shown). The drive 10 is powered from the prime mover by a force transfer means in the form of an endless belt 16.

The structure of the variable speed drive unit 10 will now be described. A non-rotatable, stationary member 18 having a bracket arm 20 and a cantilevered or extended arm 22 with a longitudinal axis 24 serves as a means for mounting the drive 10 to the power source. The bracket arm 20 includes apertures or slots 26 through which mounting screws 28 extend for securing the member 18 to the engine. The cantilevered arm 22 is provided with progressively smaller diameter portion or sections 30, 32, 34, 36 and 38.

Mounted for rotation on arm portion 22 and about axis 24 is an input drive member 39. The drive member 39 includes a housing assemblage 40 comprised of an outer portion 42, with apertured radial side portions 44 and 46, respectively. The force transfer means 16 is entrained about the assemblage 40 in a manner imparting rotary motion to the input member 39. The housing 40 of the input member defines a clutch chamber 48, a fluid return chamber 50, and an axially oriented cylinder portion or piston chamber 52. Moreover, one or more fluid passageways 54 disposed radially outward from said cylinder portion 52 permit communication between the clutch chamber 48 and the fluid return chamber 50.

Coaxially mounted for rotation on arm 22 and about said axis 24 is an output member or fan hub assembly 56. In the presently preferred embodiment, the fan hub assembly 56 includes a fan hub 58 and a member 60 arranged in driving association with the fan hub 58. The fan hub 58 includes a flange portion 62 at its outer end and a sleeve portion 64 which is telescopically arranged about reduced section 38 of the cantilevered arm 22 and extends toward an inner end of the hub assembly 56. The fan blades 14 may be releasably secured to the flange portion 62 by any suitable fastening means, i.e. bolt 66. For assembly and manufacturing purposes, at its inner end and extending for a portion of its length, the sleeve portion 64 is provided with external elongated splines 68 which cooperate with spline portion 69 on member 60 in a nonrotative, axially slidable relationship. The member 60 radially extends from the sleeve portion 64 and into the clutch chamber 48 of the drive housing 40. At its radial outermost edges, the member 60 includes another spline portion 70 for connection to portions of a friction clutch assembly.

Axially spaced bearing means are provided for rotatably mounting the input drive member 39 and the fan hub assembly 56 on the cantilevered arm 22. In the illustrated embodiment, such bearing means includes three bearing sets 72, 74 and 76. The first bearing set 72 is disposed intermediate the reduced diameter section 34 on arm 22 and the interior of the input drive member housing 40. The first bearing set is axially secured relative the arm 22 and housing 40 by means of retainer rings 78 and 80. The second bearing set 74 is disposed intermediate the sleeve portion 64 of the hub assembly 56 and the interior of the drive member 40. Retainer rings 82 and 84 serve to axially secure the second bearing set relative the hub assembly and housing. The third bearing set 76 includes axially spaced sets of needle bearings or bushings arranged about the reduced section 38 of arm 22 and the interior of sleeve portion 64. In the preferred embodiment, the first and second bearings sets 72 add 74 are anti-friction or ball bearings. By such construction, the input drive member 39 and fan hub assembly 56 are permitted to rotate relative to the mounting arm 18 and to each other.

As will be subsequently described, fluid is delivered to the interior of the drive unit 10. The housing 40 of the input member 39 combines with the fan hub assembly 56 and the cantilevered arm 22 to define a fluidically sealed enclosure. To effect that end, appropriate annular sealant means 90 and 92 are provided in combination with housing 40, at the inner and outer ends of the unit 10, to retard or prevent leakage or fluid therefrom. Conventional excluders 94 are mounted adjacent the seals 90 and 92 to protect same from environmental contaminants.

A modulatable friction clutch assembly 96 provides a slippable frictional coupling between input drive member assembly 38 and output member 56. The clutch assembly includes a pack of interleaved friction discs or elements 98, 100 which are disposed in the clutch chamber 48 of housing 40 between an annular abuttment 102 defined on housing 40 and an annular piston 104. Friction discs 98 are connected to splined portion 70 of member 60, and alternate discs 100 are connected to elongated splines 106 provided on input drive member 39. One group of the discs 98 or 100 is provided with a wet type friction facing material which is selected in combination with a lubricating fluid to provide a predetermined coefficient of friction between the discs 98,100. When sufficient pressure is applied to the plates or discs, motion is transmitted between drive member assembly 39 and driven member 56. The amount or level of pressure applied to the clutch assembly controls the torque transfer between the driving and driven members and, thereby, the speed of the fan blades 14.

In the preferred embodiment, the annular piston 104 applies an axially compressive force against one end of the clutch pack 96. The annular piston 104 rotates with the input member 39 and is mounted for axial displacement in the piston chamber 52 provided in the housing 40. By such construction, all clutch clamping forces are confined to the housing. As such, substantially no axial thrust load is applied to the axially spaced bearing means during operation of unit 10. The piston 104 cooperates with the cylinder portion 52 to define an expandable chamber 108. To effect this end, the piston 104 is appropriately sealed to retain hydraulic pressure rearward thereof in the chamber 108 as by means of a pair of conventional annular oil seals 110. The piston 104 also serves to separate clutch chamber 48 from the expandable chamber 108 formed in the housing 40. One or more annular, dished resilient members or springs 112 are captured between the piston 104 and a retainer ring 114 which is fixedly associated with the housing 40 of drive member 39. As such, the piston is normally urged to the right, as seen in FIG. 1, into a nonengaging clutch position.

Unlike other drive assemblies which may utilize the combination of air and hydraulic for operating the assembly, the present invention relies on one fluid for actuation. A plurality of fluid passageways are included with the drive assembly of the present invention. A first fluid inlet means provides operating fluid to the expansible chamber 108 from outside the housing 40. A second fluid inlet means supplies lubricating fluid from outside of housing 40 to the clutch assembly 96 and bearing means. A third fluid passageway furthermore provides a fluid outlet or return for the drive assembly 10.

The first fluid inlet means is defined by a control passage 116 provided in the stationary arm 22. As best illustrated in FIG. 2, the inlet port 118 to the control passage 116 is connected to a temperature responsive clutch regulating valve assembly 120 through suitable conduit means 122. The valve assembly 120 maybe of the type disclosed in my U.S. Pat. No. 3,804,219 granted Apr. 16, 1974, the full disclosure of which is incorporated herein by reference. Alternatively, the valve arrangement disclosed in U.S. Pat. No. 4,555,910 granted to F. Sturges on Dec. 3, 1985, could be used in combination with the instant invention. Suffice it to say, the valve assembly 120 supplies a regulated or controlled fluid pressure to the control passageway 116 as a function of engine operating temperature. Returning to FIG. 1, the other end of the control passage 116 opens to a rotating joint 124 sealed on opposite sides by annular piston rings 126. The rotating joint 24 is defined by an annular passage 128 provided on reduced diameter section 36 of arm 22 and a radially extending bore 130 provided in housing 40. The annular passage 128 communicates with the expansible chamber 108 through the radially extending bore 130 so as to provide pressure from the valve assembly 120 thereto. As may be readily appreciated, the amount or level of fluid pressure directed to the expandable chamber controls the axial compressive force applied by piston 104 to the clutch assembly and, therefore, the output speed of the fan.

A stepped axial bore 132 having reduced adjacent sections 134, 136, 138, 140 and 142 may also be provided in the cantilevered arm 22. A hollow tube assembly 144 is axially fixed within the bore 132. The inner end of the tube assembly is supported in bore section 134 while its other end is supported by bore section 138. The bore section 136 intermediate the supported ends of the tube assembly 144 is larger than the diameter of the midsection of the tube assembly. By such construction, two fluid passageways 146, 148, one inside and one outside of the tube assembly 144 are established and maintained. The fluid passageway 146 inside the tube defines, in part, the second fluid inlet means. The fluid passageway 148 outside the tube defines, in part, the fluid return means of the present invention. An end plug 150 closes the inner end of bore 132. As best seen in FIGS. 1 and 2, a radially directed port 152 opens to the fluid passageway 146 inside the tube. As seen in FIG. 2, port 152 is connected to a fluid supply source 154 which provides fluid under pressure to the second fluid inlet means. Returning to FIG. 1, one or more radially directed ports 156 provided in arm 22 extend from the axial bore 132 and communicate with the clutch chamber 48 through radially directed holes 158 and 160 provided in the sleeve portion 64 of the hub assembly 56 and member 60, respectively. As such, fluid is directed through the second fluid inlet means to lubricate and wet the clutch assembly 96 and bearing sets 74 and 76. A metered orifice 162 may also be provided in the sleeve portion 64 of the hub assembly 56 for delivering lubricant to the bearing set 74.

In addition to fluid passageway 148, the fluid return means of the present invention includes a stationary pitot tube or impact laddling member 164 which defines means for automatically withdrawing fluid from the clutch chamber when the driving member is rotated. The pitot tube 164 fluidically communicates with the fluid passageway 148 through a radially directed aperture 166 and radially extends into the fluid return chamber 50 in housing 40. The pitot tube and fluid passageway 148 ultimately open to a discharge port 168. As may be best seen in FIG. 2, through a proper conduit 170, the discharge port 168 may empty to a fluid reservoir 172. As input drive member assembly 39 is rotated, fluid delivered to the clutch chamber 48 centrifugally forms an annular ring of rotating fluid which is communicated to the fluid return chamber 50 by way of fluid passageways 54. The circulating fluid from the clutch chamber 48 impinges on the open end of the pitot tube 164 and is automatically returned through the tube 164, radial port or aperture 166 and passageway 148 to exhaust port 168 from whence it flows to the lubricant reservoir. As the circulating fluid impinges on the open end of tube 164, pressure may be created to force the lubricant through the fluid return means. In the presently preferred embodiment, a metered orifice 174, having one end opening to the passageway 148 and the other end opening to a location adjacent the bearing set 72 is provided in the cantilevered arm 22. Some of the pressurized fluid flowing from the pitot tube is directed through this metered orifice 174 so as to lubricate the bearing set 72.

Turning now to FIG. 3, cooperative means are arranged on the rotating input drive member assembly 39 and the rotary mounted hub assembly 56 for preventing cord debris from becoming entangled about the rotary components of the drive unit 10. In the preferred embodiment, the circumferential edge of flange portion 62 of hub assembly 56 is provided with a series of radially extending projections or teeth 176. Arranged in a complimentary manner on the housing side portion 46 are a plurality of fins 178. When the input member 38 rotates with respect to the hub assembly 56, or vice versa, the elements 176 and 178 combine to define an attrition mill which prevents belt threads or other debris from becoming entangled with the rotating members.

When installed, the mounting bracket 18 of the drive unit 10 is fastened to the engine or other suitable nonrotating element. Power is imparted to the unit 10 by the force transfer means 16. That is, the belt or force transfer means 16 rotates the drive member assembly 39 which is rotatably mounted by axially spaced bearings on the cantilevered arm 22. Rotary motion may be transmitted from drive member 39 to the fan hub assembly 56 by the clutch assembly 96. The ratio of input drive speed to output drive speed is determined by the axial compressive force imparted against the clutch assembly 96 by the piston 104. Of course, the degree of axial compressive force is determined by the amount of fluid pressure in the expansible chamber 108. That is, hydraulic pressure, introduced at port 18 from the valve assembly 120, is supplied to the expandable chamber 108 across the rotating joint 124.

One salient feature of the present invention is that substantially no axial thrust load is imparted to the spaced bearings during clutch operation. That is, since the piston 104 and expandable chamber 108 are formed as part of the drive input member assembly 39, all clutch clamping forces are confined to the housing 40. As such, substantially no axial thrust load is transferred to the bearings. Additionally, since fluid pressure is transferred across a rotating joint, no additional bearings are required to isolate parts with relative rotation.

Lubricating oil for the clutch pack 96 is supplied to the clutch chamber through the second fluid inlet means connected to inlet port 152. Some of the lubricant is entrained in the bearings 76 and some flows to the other bearing set 74 through the metered orifice 162. The lubricant flow continues into the spline hub 60 through holes 158 and 60 for distribution to the clutch pack 96. After passing through the clutch pack, the lubricant passes through passageways 54 to the return chamber 50 in housing 40. The pressure generated by the lubricant impacting on the open end of the pitot tubes 164 causes the oil to flow to the outlet passage and ultimately to the discharge port 168 from whence it is returned to the oil reservoir 172.

As the unit continues to operate, the belt may become worn and begin to deteriorate. Any belt debris or cords which could create potential problems are treated by the cooperative elements 176 and 178 provided on the input and output members. Because of their relative turning motion, these members will coact to destruct any debris which is entrapped therebetween whereby assuring continued and unhampered operation of the unit.

Thus, there has been provided a VARIABLE SPEED DRIVE FOR ENGINE COOLING FANS which fully satisfies the objects, aims and advantages set forth above. While the invention has been described in connection with a specific embodiment thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

I claim:

1. A fan drive assembly comprising:
   a nonrotatable mounting member having a cantilevered shaft portion;
   relatively rotatable driving and driven members rotatably and coaxially arranged on said shaft portion by axially spaced bearings, with said driving member being provided with a fluid receiving chamber;
   a wet clutch assembly disposed intermediate to said driving and driven members, said clutch assembly including at least two friction elements operatively connected to said respective members and adapted to be axially compressed to relatively couple said members, with said coupling varying as to relative rotational slip of said members in accordance with the force of axial compression thereon; and
   a fluidically actuatable member cooperatively arranged in said chamber for applying a force of axial compression on said friction elements to compress same as a function of the amount of fluid pressure introduced into said chamber, said actuatable member and said chamber being arranged such that substantially no axial thrust load is applied to said bearings when a force of axial compression is applied to said friction elements;
   said driving and driven members being provided with complementary means for preventing cord debris from becoming entangled thereabout.

2. A variable speed fan drive assembly comprising:
   a cantilevered support member having a fixed longitudinal axis;
   an input drive member mounted on said support member and which is subject to rotation thereabout, said input drive member defining an expandable chamber;
   a hub assembly mounted on and subject to rotation about said support member and including a splined member which rotates with said hub assembly, wherein said input drive member and said hub assembly are provided with complimentary means for preventing cord debris from entangling thereabout;
   axially spaced bearing means rotatably mounting said input drive member and said hub assembly on said support member, said bearing means including a first bearing set disposed between said input drive member and said support member, a second bearing set disposed between said input drive member and said hub assembly, and a third bearing set disposed between said hub assembly and said support member;
   a wet clutch assembly operably connected between said input drive member and said splined member in a manner providing a slippable coupling between said input drive member and said hub assembly;
   a fluid operated ram cooperatively arranged with said expandable chamber for engaging and disengaging said clutch as a function of pressure applied by said ram against said clutch and in a manner whereby substantially no axial thrust load is exerted on said bearing means during engagement of said clutch; and means for admitting fluid pressure to said expandable chamber in a manner controlling the pressure applied by said ram and thereby the effectiveness of said clutch.

3. A variable speed fan drive assembly comprising:

a mounting bracket having a cantilevered arm with a fixed longitudinal axis;

an input drive member and a fan hub both of which are supported by bearing means on said mounting bracket for rotation about the longitudinal axis of said arm, said input drive member being provided with a chamber;

a wet clutch assembly for releasably engaging said fan hub with said input drive member, said clutch assembly including at least two clutch members operably attached respectively to said input drive member and to said fan hub for establishing a slippable connection between same and whose operable effectiveness is determined by the axial compression force exerted thereagainst;

a pressure responsive ram cooperatively arranged within said chamber rotation with said input drive member to exert an axial compression force on said clutch assembly when fluid is introduced into said chamber and in a manner whereby said ram exerts substantially no axial thrust load on said bearings during operation; and means for admitting fluid pressure to said chamber;

said input drive member and said fan hub including complementary means for preventing debris from becoming entrained thereabout.

* * * * *